Patented Dec. 17, 1940

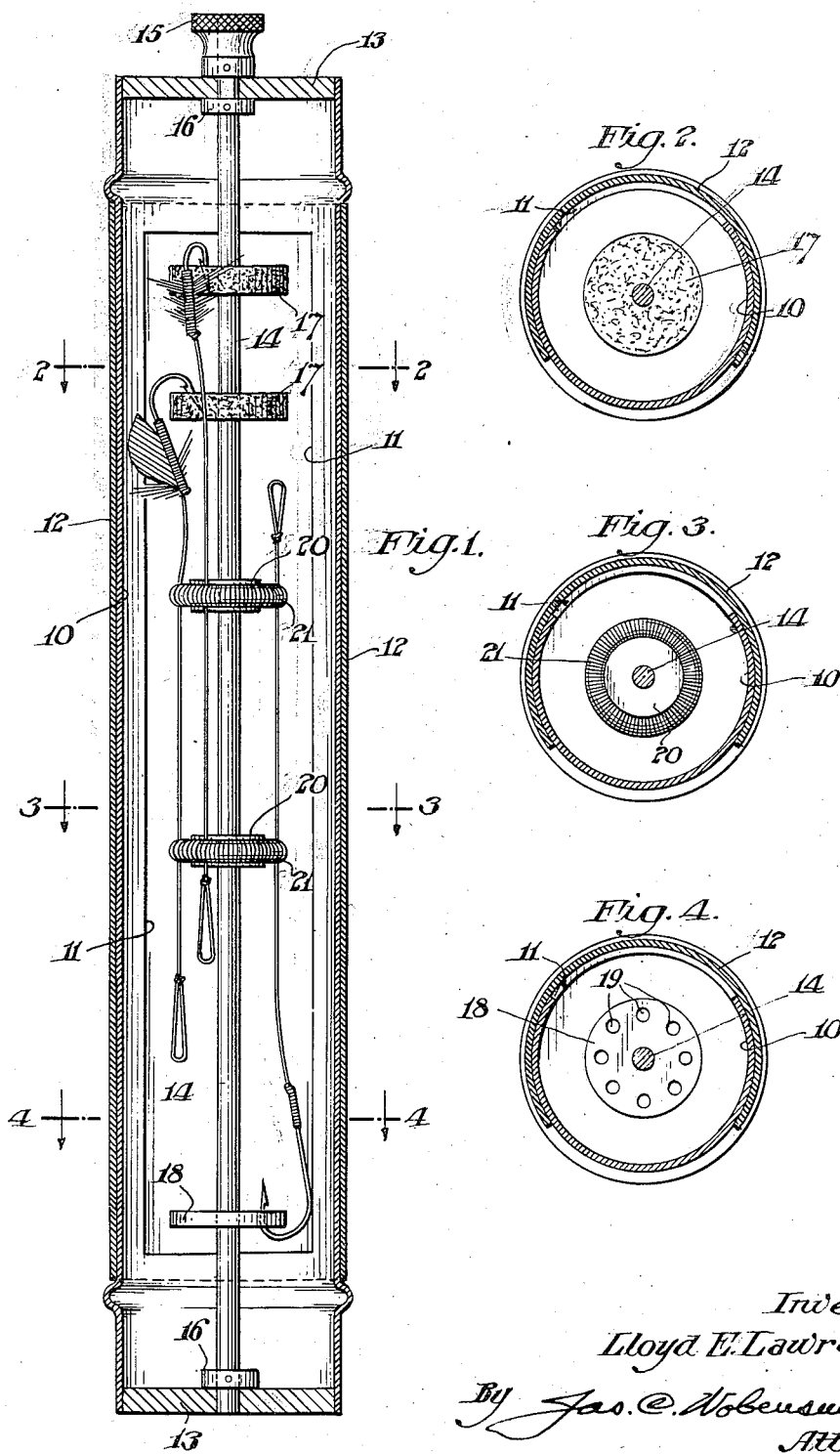

2,225,309

UNITED STATES PATENT OFFICE 2,225,309

CARRIER FOR FISHHOOKS AND ARTIFICIAL FLIES

Lloyd E. Lawrence, Philadelphia, Pa.

Application June 17, 1940, Serial No. 340,928

5 Claims. (Cl. 43—32)

This invention relates to carriers for fishhooks and artificial flies used by anglers. Heretofore one of the vexing problems of anglers has been the carrying of their fishhooks and artificial flies to and from the places of use. Not only do the same have a tendency to become entangled with each other, and to catch in various objects, but also, after the same have been used, the snells of the hooks and flies, which are made of catgut or the like, and which become quite pliable and flexible when wet, will if permitted to become curled or bent retain such undesired shape when they subsequently become dry. Also the artificial flies are quite delicate and easily injured unless proper means are used to protect the same.

The principal object of the present invention is to provide a carrier for fishhooks and artificial flies, whereby the same will be adequately protected against injury, and which will prevent the same from becoming snarled and entangled when not in use.

A further object of the invention is to provide a carrier for fishhooks and artificial flies which is so constructed and arranged that access may be quickly and conveniently had to the desired hook or fly.

A further object of the invention is to provide means for holding the snells of the hooks and flies in proper positions so that the same will not, after being used, be permitted to dry out in distorted shapes.

The nature and characteristic features of the invention will be more readily understood from the following description, taken in connection with the accompanying drawing forming part hereof, in which:

Figure 1 is a vertical central sectional view of a carrier, for fishhooks and artificial flies, embodying the main features of the present invention;

Fig. 2 is a horizontal section thereof, taken on the line 2—2 of Fig. 1;

Fig. 3 is a horizontal section thereof, taken on the line 3—3 of Fig. 1; and

Fig. 4 is a horizontal section thereof, taken on the line 4—4 of Fig. 1.

It will of course be understood that the description and drawing herein are illustrative merely, and that various changes and modifications may be made in the structure disclosed without departing from the spirit of the invention.

Referring to the drawing, 10 is a cylindrical casing having an opening 11 in one side thereof extending the greater part of the length of the casing 10. A closure shell 12 is provided, shaped complemental to the external surface of the main casing 10, said shell being of arcuate form in cross section, and of such circumferential extent as to provide an opening in said shell complemental to the opening 11 in the casing, when said shell is shifted around the casing 10.

A disc member 13 is mounted at each end of the casing 10, being fixedly secured thereto. Extending from end to end, coincident with the axis of the casing 10 is a shaft 14, which is journalled at its ends in the disc members 13.

The shaft 14 may project externally at one end and be provided on this extension with a knurled knob 15 for the convenient rotation of the shaft 14 with respect to the casing 10. Collars 16 mounted on the shaft 14 serve to prevent longitudinal movement of the shaft 14 with respect to the casing 10.

The shaft 14 has fixedly mounted thereon, near one end of the casing 10, a pair of felt discs 17 suitably spaced with respect to each other, and adapted to receive the pointed ends of the hook portions of the flies.

Near the other end of the shaft 14 there is mounted a disc 18, preferably made of fiber or similar tough material, which disc 18 is also fixedly secured to the shaft 14. The disc 18 is provided with a plurality of apertures 19, extending therethrough for the reception of the barbed ends of the plain fishhooks which are used for bait fishing.

Disposed between the felt discs 17 and the fiber disc 18 is a pair of spaced discs 20 each of which has a coil spring 21 mounted on the periphery thereof. The discs 20, which have the springs 21 mounted thereon, are also fixedly secured to the shaft 14 so as to be constrained to rotate in unison therewith.

In the foregoing description of the preferred form and arrangement, the felt discs 17 are described as being adapted to receive the hook portions of the flies, and the apertured fiber disc 18 as adapted to receive the ends of the plain fishhooks which are used for bait fishing. It should however be understood that, if desired, the same type of discs may be used throughout, or in other arrangements than as shown and described. That is to say, felt discs may be used for the reception of the plain hooks which are used for bait fishing or, if so desired, apertured fiber discs may be used for the reception of the hook portions of the flies.

The operation of the apparatus will be readily understood. When access to the interior of the casing 10 is desired, the shell 12 is rotated on the casing 10 to expose the opening 11 of the casing 10. The shaft 14 may now be rotated to any desired position by means of the knurled knob 15 at the end thereof, so that any desired hook or fly may be brought to the proper position to be easily removed for use on the line. To remove a hook or fly, it is necessary merely to first pull the snell thereof from its engagement with the coil springs 21, and then disengage the hook proper from the disc with which it is in engagement.

The hook portions of the flies are, as hereinbefore pointed out, embedded in the felt discs 17 near one end of the shaft 14, and the snells thereof are extended in substantially straight lines and held in the convolutions of the springs 21, which are carried by the discs 20. Likewise the bait hooks are mounted with the barbed ends thereof in the apertures 19 in the disc 18 and the snells thereof similarly held in the convolutions of the springs 21.

After a hook or fly has been used, and is removed from the line in a wet condition, the same may be replaced in the carrier with the hook portion thereof in the proper disc, the snell being then straightened out and pushed between the convolutions of the springs 21 whereby the same will be held in proper shape until it is dried.

I claim:

1. A carrier for fishhooks and artificial flies comprising an enlongated casing having a longitudinal opening in one side thereof, a closure member for said opening, a shaft rotatably mounted in the casing, a disc carried by said shaft near one end thereof and adapted to be engaged by the hooks and the hook portions of the flies, another disc carried by said shaft, and a coil spring mounted on the periphery of said disc and adapted to receive and hold the snells of the hooks and flies.

2. A carrier for fishhooks and artificial flies comprising an elongated casing having a longitudinal opening in one side thereof, a closure member for said opening, a shaft rotatably mounted in the casing, a disc carried by said shaft near one end thereof and adapted to be engaged by the hooks and the hook portions of the flies, another disc carried by said shaft, a coil spring carried by said disc and adapted to receive and hold the snells of the hooks and flies, and means for manually rotating said shaft.

3. A carrier for fishhooks and artificial flies comprising a cylindrical casing having a longitudinal opening in one side thereof, a closure member for said opening, a central shaft rotatably mounted in the casing, discs carried by said shaft near the ends thereof and adapted to be engaged by the hooks and the hook portions of the flies, a plurality of intermediately spaced discs carried by said shaft, and coil springs carried by said discs adapted to receive and hold the snells of the hooks and flies.

4. A carrier for fishhooks and artificial flies comprising a cylindrical casing having a longitudinal opening in one side thereof, a closure member for said opening, a central shaft rotatably mounted in the casing, discs carried by said shaft near the ends thereof and adapted to be engaged by the hooks and the hook portions of the flies, a plurality of intermediately spaced discs carried by said shaft, coil springs carried by said discs and adapted to receive and hold the snells of the hooks and flies, and means for manually rotating said shaft.

5. A carrier for fishhooks and artificial flies comprising a cylindrical casing having a longitudinal opening in one side thereof, a closure member for said opening, a central shaft rotatably mounted in the casing, discs carried by said shaft near the ends thereof and adapted to be engaged by the hooks and the hook portions of the flies, a plurality of intermediately spaced discs carried by said shaft, coil springs carried by said discs and adapted to receive and hold the snells of the hooks and flies, and a knob externally mounted on the shaft for manually rotating the same.

LLOYD E. LAWRENCE.